(12) United States Patent
Kim et al.

(10) Patent No.: US 8,089,862 B2
(45) Date of Patent: Jan. 3, 2012

(54) HARQ AND BANDWIDTH REQUEST METHOD IN WIRELESS ACCESS SYSTEM

(75) Inventors: Sung Kyung Kim, Daejeon (KR); Chul Sik Yoon, Seoul (KR)

(73) Assignees: Electronics and Telecommunications Research Institute, Daejeon (KR); Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 12/192,283

(22) Filed: Aug. 15, 2008

(65) Prior Publication Data

US 2009/0147740 A1 Jun. 11, 2009

(30) Foreign Application Priority Data

Dec. 7, 2007 (KR) .................. 10-2007-0127003

(51) Int. Cl.
*H04L 12/26* (2006.01)
(52) U.S. Cl. ........................ 370/216; 370/236
(58) Field of Classification Search .......... 370/216, 370/468, 298, 310, 236
See application file for complete search history.

(56) References Cited

U.S. PATENT DOCUMENTS

| | | | |
|---|---|---|---|
| 7,339,949 B2 | 3/2008 | Suzuki et al. | |
| 2007/0038922 A1* | 2/2007 | Kim et al. | 714/776 |
| 2007/0060146 A1* | 3/2007 | Won et al. | 455/445 |
| 2007/0113138 A1 | 5/2007 | Kwon et al. | |
| 2007/0245202 A1 | 10/2007 | Kim et al. | |
| 2007/0263739 A1* | 11/2007 | Garrett et al. | 375/260 |
| 2008/0034107 A1* | 2/2008 | Lee et al. | 709/232 |
| 2008/0123590 A1* | 5/2008 | Jung et al. | 370/329 |
| 2008/0133995 A1* | 6/2008 | Lohr et al. | 714/748 |
| 2008/0159220 A1* | 7/2008 | Kitchin et al. | 370/329 |
| 2009/0059801 A1* | 3/2009 | Garrett et al. | 370/242 |

FOREIGN PATENT DOCUMENTS

| | | |
|---|---|---|
| KR | 10-2003-0017401 A | 3/2003 |
| KR | 10-2007-0043552 A | 4/2007 |
| KR | 10-2007-0093658 A | 9/2007 |
| WO | 2007/092771 A1 | 8/2007 |

* cited by examiner

*Primary Examiner* — Gary Mui
(74) *Attorney, Agent, or Firm* — Jefferson IP Law, LLP

(57) ABSTRACT

The present invention relates to a resource reallocation and bandwidth request method in a wireless access system. The present invention uses the synchronous HARQ mode together with the asynchronous HARQ mode according to scheduling by the HARQ retransmission burst. Therefore, a resource allocation overhead for a retransmission burst is reduced during the synchronous HARQ mode operation. Also, an uplink transmission delay is reduced, and efficiency of the radio resource is maximized.

16 Claims, 4 Drawing Sheets

HARQ AND BANDWIDTH REQUEST METHOD IN WIRELESS ACCESS SYSTEM

CROSS-REFERENCE TO RELATED APPLICATION

This application claims priority to and the benefit of Korean Patent Application No. 10-2007-0127003 filed in the Korean Intellectual Property Office on Dec. 7, 2007, the entire contents of which are incorporated herein by reference.

BACKGROUND OF THE INVENTION (a) Field of the Invention

The present invention relates to a resource reallocation and bandwidth request method in a wireless access system.

(b) Description of the Related Art

In the various wireless access systems, the WiMax system is classified into various services according to the used frequency resource, and the Wibro service belonging to the various services uses the asynchronous hybrid automatic repeat request (HARQ) method in order to maximize the scheduling effect according to the HARQ. In other words, a base station scheduler dynamically allocates a retransmission time for the bursts requiring retransmission and a transmission mode of retransmission packets through a MAP in order to maximize system capacity or satisfy the QoS.

The above-noted method is excellent for HARQ performance. However, services having a real-time characteristic such as speech may not have a great asynchronous HARQ gain since they do not have a sufficient retransmission time. Also, the method increases an overhead of the MAP since it is required to transmit an information element for the retransmission burst to the terminal each time.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for reallocating a resource according to a HARQ mode and a method for requesting a bandwidth in a wireless access system.

An exemplary embodiment of the present invention provides a resource reallocation method including: receiving a first frame including a plurality of bursts corresponding to a plurality of pieces of burst information from a base station, the burst information including uplink burst information and downlink burst information; storing the plurality of pieces of burst information from the received first frame, and checking first burst information allocated to itself; checking burst retransmission information when failing to receive the first burst from the first frame; and receiving the first burst from the first frame when the burst retransmission information includes the first burst information, the first burst being set to be a first retransmission mode.

Another embodiment of the present invention provides a resource reallocation method including: receiving a first frame including a plurality of bursts corresponding to a plurality of pieces of burst information from a base station, the burst information including uplink burst information and downlink burst information; when failing to receive a first burst corresponding to first burst information from the first frame, checking burst retransmission information included in a second frame, the second frame being a retransmission frame established by a synchronous HARQ mode; when the burst retransmission information includes the first burst information, receiving the first burst in the second frame; and when the burst retransmission information does not include the first burst information, determining that the first burst is established by an asynchronous HARQ mode, and receiving the first burst in the frame including the first burst information from among the frames that are transmitted after the second frame.

Yet another embodiment of the present invention provides a resource reallocation method including: allocating a burst to a terminal, the burst including an uplink burst and a downlink burst; including burst information corresponding to the allocated burst in a first frame, and transmitting the same to the terminal; when receiving a retransmission request message from the terminal because of transmission failure of a HARQ feedback for the burst, establishing a retransmission mode of the burst; when the established retransmission mode is a synchronous HARQ mode, including retransmission burst information on the burst and a burst to be retransmitted at a predetermined retransmission time, and transmitting the same to the terminal; and when the established retransmission mode is an asynchronous HARQ retransmission mode, generating retransmission time information on the burst, transmitting it to the terminal, and retransmitting the downlink burst in a second frame that is the retransmission time information.

According to the present invention, since the synchronous HARQ and the asynchronous HARQ can be used altogether in the HARQ operation, a resource allocation overhead for a retransmission burst can be reduced in the synchronous HARQ operation.

Further, an uplink transmission delay is reduced, and radio resource efficiency is maximized.

DETAILED DESCRIPTION OF THE EMBODIMENTS

Figure 1:
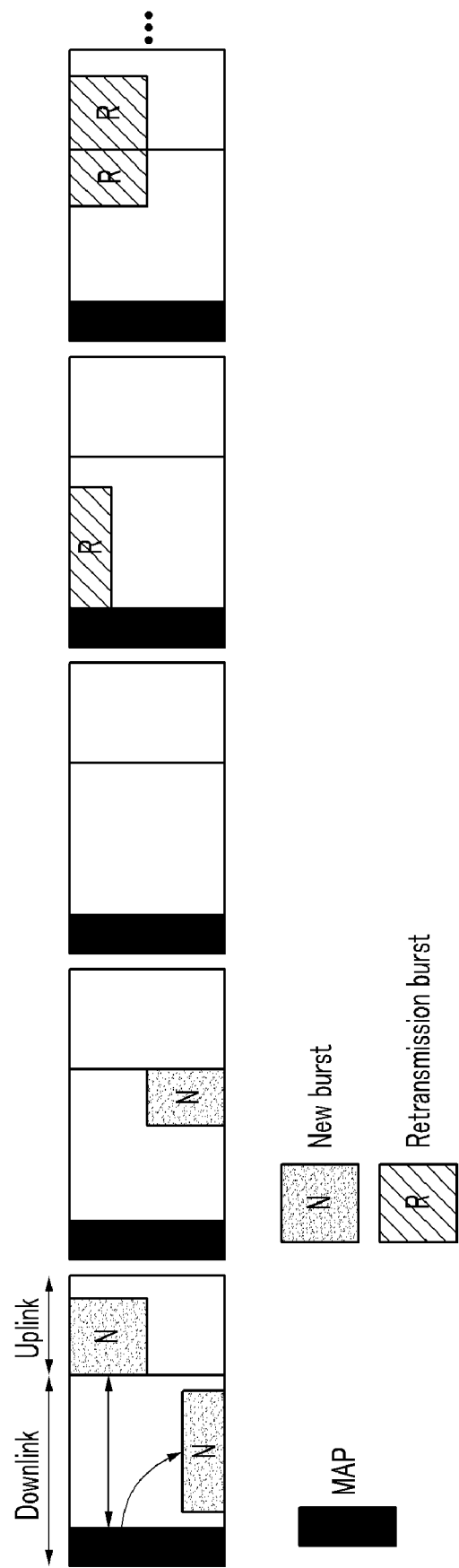
FIG. 1 shows a HARQ transmission process in a general first wireless access system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" and "comprising", will be understood to imply the inclusion of stated elements but not the exclusion of any other elements. In addition, the terms "-er", "-or", and "module" described in the specification mean units for processing at least one function and operation and can be implemented by hardware components, software components, and combinations thereof.

In the specification, a mobile station (MS) may indicate a terminal, a mobile terminal (MT), a subscriber station (SS), a portable subscriber station (PSS), user equipment (UE), and an access terminal (AT), and may include the entire or partial functions of the terminal, mobile terminal, subscriber station, portable subscriber station, user equipment, and access terminal.

In the specification, a base station (BS) may indicate an access point (AP), a radio access station (RAS), a node B (Node B), a base transceiver station (BTS), and a mobile multihop relay base station (MMR-BS), and may include the entire or partial functions of the access point, radio access station, node B, base transceiver station, and mobile multihop relay base station.

Before describing HARQ transmission and resource allocation according to an exemplary embodiment of the present invention, a HARQ transmission process in the general wireless access system will now be described with reference to FIG. 1 and FIG. 2. Here, FIG. 1 shows the Wibro service from among various wireless access systems, and FIG. 2 shows an ultra mobile broadband (UMB) system.

FIG. 1 shows a HARQ transmission process in the general first wireless access system.

As shown in FIG. 1, the first wireless access system uses the same information element (IE) irrespective of the fact that the information element that is broadcast through the MAP is for packet retransmission or initial data burst transmission. Here, FIG. 1 shows a process for transmitting a packet based on the HARQ by using the information element used for HARQ retransmission.

Figure 2:
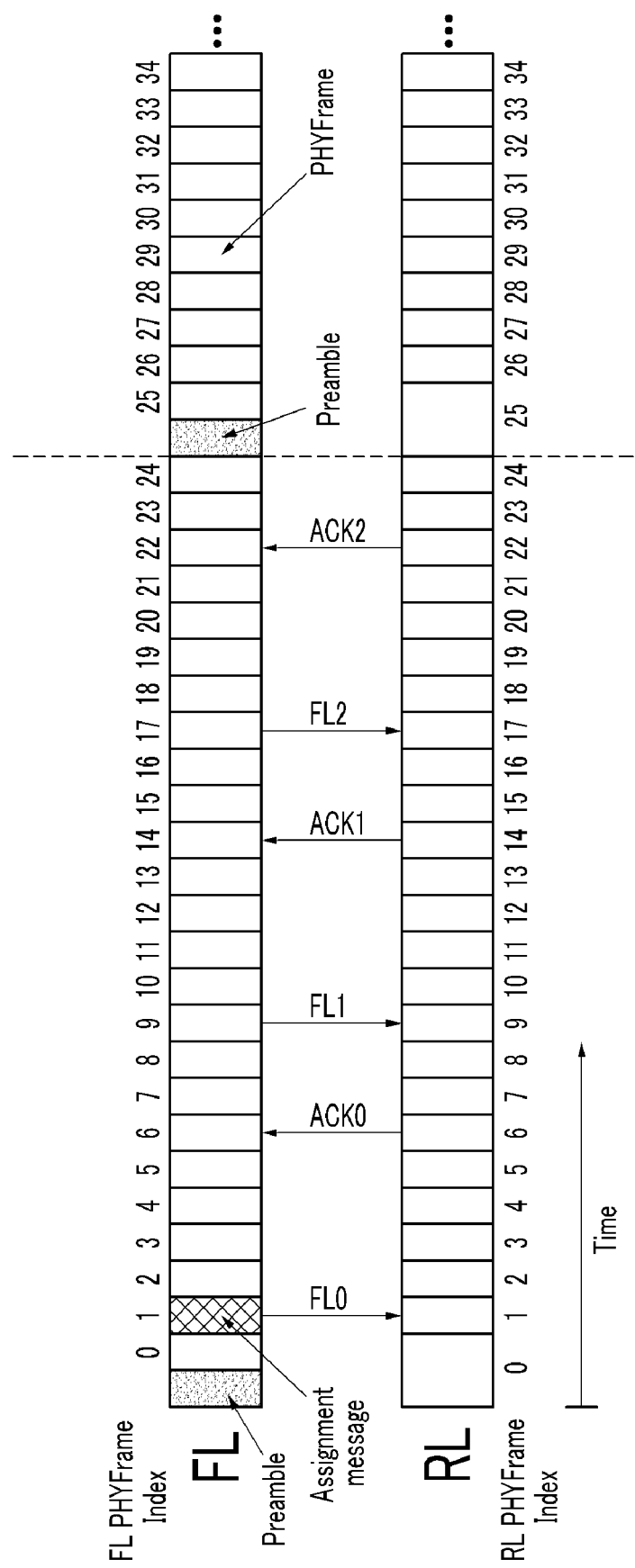
FIG. 2 shows a HARQ transmission process in a general second wireless access system.

FIG. 2 shows a HARQ transmission process in the general second wireless access system.

As shown in FIG. 2, the UMB system uses the synchronous HARQ method. That is, a transmission time and a transmission mode for the retransmission burst are predefined.

In this instance, the synchronous HARQ method provides a low scheduling gain since it has a great priority for the retransmission burst. Also, since a resource for the retransmission burst is reserved in advance, a signaling overhead required for resource allocation is reduced, a radio resource is fragmented, and a resource usage rate is decreased.

Therefore, it is required to use the asynchronous HARQ method together with the synchronous HARQ method according to the terminal's link state and scheduling. The first wireless access system transmits feedback information on a downlink HARQ traffic according to the synchronous ACK method. That is, the terminal having received a downlink HARQ burst uses a predetermined HARQ ACK channel after a predetermined frame and transmits 0 or 1 in order to notify a base station of an ACK and a NAK.

A resource allocation method for a HARQ burst in the broadband mobile packet system using a synchronous HARQ together with an asynchronous HARQ according to an exemplary embodiment of the present invention will now be described with reference to FIG. 3.

Figure 3:
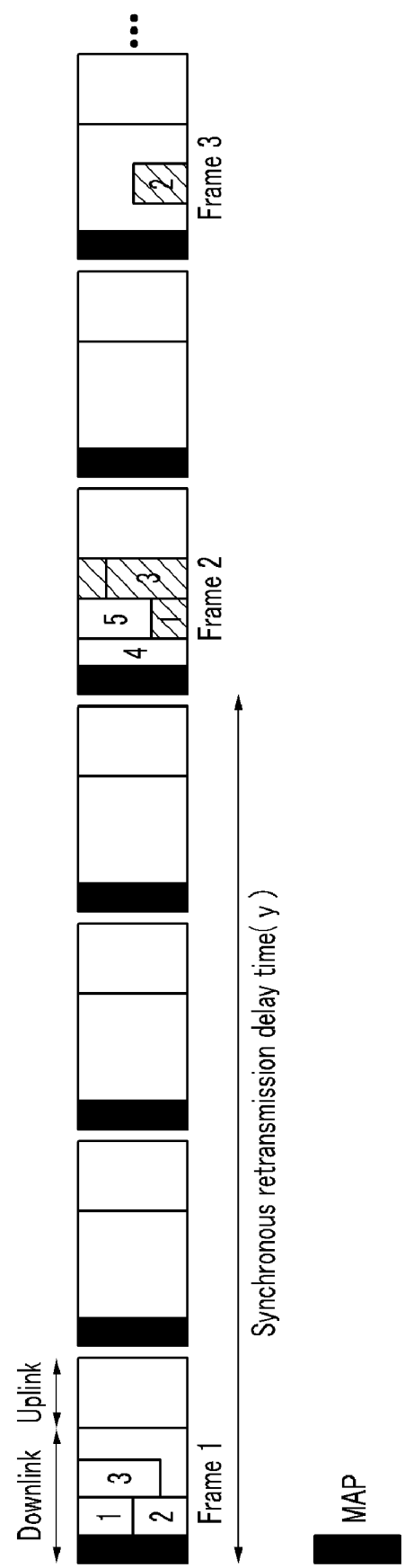
FIG. 3 shows a resource allocation method for a retransmission HARQ burst according to an exemplary embodiment of the present invention.

FIG. 3 shows a resource allocation method for a retransmission HARQ burst according to an exemplary embodiment of the present invention.

As shown in FIG. 3, the terminal supporting the HARQ method can use the synchronous HARQ method together with the asynchronous HARQ method according to the type of the service provided by the base station or the link state with the base station. The terminal in this case can maximize and utilize the radio resource.

When the base station is a central control system for managing and allocating the radio resource, the base station can change the HARQ mode for each terminal or service. In other words, the base station can adequately select and use a synchronous HARQ mode or an asynchronous HARQ mode for each terminal or service.

However, the system such as the Wibro can change the HARQ mode through MAP resource allocation without additional signaling for changing the HARQ mode by the base station. That is, when the base station does not allocate a resource for a retransmission burst at a retransmission time predetermined for applying the synchronous HARQ mode, it is indirectly known that the terminal is changed from the synchronous HARQ mode to the asynchronous HARQ. The exemplary embodiment of the present invention will be described with reference to the system, and it is assumed that the HARQ mode change is managed for each new burst and the initial burst transmission uses the synchronous HARQ mode.

Also, when the terminal is operated by the synchronous HARQ mode, the base station groups an information element for the retransmission burst, includes it into the MAP, and notifies the terminal of it. A corresponding operation of the terminal will now be described.

First, the terminal checks whether a new uplink burst and a new downlink burst are allocated to the terminal through information included in the MAP. When a new uplink burst and a downlink burst are allocated to the terminal, the terminal stores burst information (e.g., burst length and burst allocation order) allocated to the terminal in the burst allocated frame. In this instance, the terminal stores information on the bursts allocated to other terminals together with the burst information allocated to the terminal.

In the exemplary embodiment of the present invention, the downlink burst will be mainly described, and the uplink burst will be reallocated in a like manner of the downlink burst.

First when the terminal fails to receive a downlink burst from the base station, the terminal notifies the base station of non-acknowledgment of the downlink burst through a HARQ ACK channel (also referred to as an uplink feedback channel). The terminal stands by for retransmission of a burst from the base station through the synchronous HARQ mode or the asynchronous HARQ mode.

Similarly, the base station may fail to receive the burst from the terminal and transmits uplink burst retransmission information to the terminal, or the base station may not notify the terminal of a burst receiving result when having received the burst. In this case, the terminal holds the corresponding burst to be transmitted to the base station in a buffer when the maximum retransmission delay time is passed, when a new burst is allocated through the corresponding HARQ channel, or when corresponding uplink burst retransmission is allocated.

Here, a scheduler in the base station determines through which one of the synchronous HARQ mode (first retransmission mode) or the asynchronous HARQ mode (second retransmission mode) to retransmit the burst that is not transmitted to the base station or the terminal to the terminal. The method for the scheduler to determine one of the synchronous HARQ mode and the asynchronous HARQ mode will not be described in the exemplary embodiment of the present invention.

When a resource for a burst of the terminal is allocated in the synchronous HARQ retransmission frame, a location of a slot for actually transmitting the corresponding burst is detected through burst information allocated in the initial transmission. However, when a resource for retransmission is not allocated, it is sensed that the mode is changed to the asynchronous HARQ mode, and it is checked whether reallocation information on the burst is provided with reference to the MAP for each frame.

When the above-description is depicted with reference to FIG. 3, FIG. 3 shows that the first burst, the second burst, and the third burst initially transmitted in the first frame are not transmitted to the respective terminals and are then retransmitted in the second frame. FIG. 3 shows a downlink burst retransmission method, and uplink burst retransmission is performed in a like manner.

When receiving burst non-acknowledgment information from the respective terminals for providing a first burst, a second burst, and a third burst through the uplink feedback channel, the base station generates reallocation information on the transmission failed bursts. Here, the scheduler of the base station is assumed that the first burst and the third burst are set by the synchronous HARQ mode and are retransmitted in the second frame by the scheduler of the base station and the second burst is set by the asynchronous HARQ mode and is not retransmitted in the second frame. The terminal for receiving the second burst senses that the mode is changed into the asynchronous HARQ mode, and it must consecutively check whether the burst of the terminal is reallocated through the MAP.

In other words, the base station includes a retransmission information element for a plurality of bursts that are not transmitted to the respective terminals in the MAP of the second frame by the synchronous HARQ mode and transmits the same to the terminals. The terminals can know whether the burst of the terminal is retransmitted in the second frame based on the retransmission information element included in the MAP of the second frame.

In this instance, the information elements of the retransmission bursts are shown in Table 1. The format expressed in Table 1 is applicable to an uplink burst request and a downlink bandwidth request.

TABLE 1

| Syntax | Bits | Note |
| --- | --- | --- |
| Extended-xIUC2 | 4 | |
| Length | 4 | Bitmap length |
| Allocation BitMap | | Map allocated for synchronous HARQ retransmission. It indicates retransmission state of burst failing to receive in the initial transmission frame. |
| Duration | 8 | Entire duration (slot) of retransmission bursts allocated in allocation bitmap |

Here, 4-bit allocated length information provides information on the length of the bit map. Here, the number of information on the length of the bitmap corresponds to the number of bursts in the initial transmission frame (or in a predetermined allocation group). The duration represents the entire duration of retransmission bursts established in the allocation bitmap.

The allocation bitmap is allocated so as to retransmit the burst in the synchronous HARQ mode, and it notifies the terminal that fails to receive a downlink burst transmitted in the initial transmission frame of a burst retransmission state. In this instance, the bit is set to be 1 in order to correspond to the burst transmitted by the synchronous HARQ mode, and the burst allocation order in the initial transmission frame (the first frame) corresponds to the allocation burst bit order in the allocation bit map.

A plurality of terminals failing to receive the downlink burst identify the bit that corresponds to the allocation order of the terminals in the allocation bitmap. The terminal determines whether a resource for retransmitting the burst of the terminal is allocated to the second frame.

Here, the terminal knows the allocation order in the second frame since it knows burst information including information on the allocation number of the burst of the terminal through the initial transmission in the first frame. Also, when there is a new burst allocated in the second frame, the terminal can know the location of the burst of the terminal based on resource information and a retransmission information element.

In other words, the terminal identifies the bit corresponding to the allocation order of the terminal from among the information allocation bitmap. When the identification result bit is 1, the terminal calculates a location for reallocating the burst of the terminal according to allocation information in the initial frame and the number of bits of a newly allocated burst in the current frame.

For example, it is assumed that the burst allocated to a specific terminal corresponds to the third burst in the initial frame, i.e., the first frame. Also, it is assumed that the length of the first burst has 5 slots, the length of the second burst has 10 slots, and the length of the third burst has 4 slots.

When a specific terminal has checked 101 from the allocation bitmap of the information element for the retransmission bursts through the MAP of the second frame, the first burst and the third burst are retransmitted by the synchronous HARQ method in the second frame. Therefore, the specific terminal considers the burst length for retransmitting the first burst and the lengths of newly transmitted bursts in the second frame, adds the lengths of newly transmitted bursts and the 5 slots corresponding to the length of the first burst, and reallocates the third burst that is the burst of the specific terminal.

The second burst indicated by 0 in the allocation bitmap of the information element for the retransmission bursts included in the MAP of the second frame is not reallocated in the second frame. Therefore, the terminal for the second burst determines whether the second burst is allocated by consecutively checking the MAP included in the subsequent frame.

When a resource for the second burst is allocated by the asynchronous HARQ method in the third frame, the MAP of the third frame includes information of notifying that a resource for the second burst is allocated, and hence, the terminal for using the second burst can know that a burst is allocated to the terminal in the third frame.

Retransmission on the downlink burst has been described, and retransmission on the uplink burst is performed in a like manner. In other words, regarding the uplink burst, the base station has no need to transmit an additional HARQ ACK bit map for the uplink burst allocated by the base station to the terminal. When the allocation bit map of Table 1 received from the terminal is indicated as 1, the corresponding uplink burst is determined to be not transmitted to the terminal, and the resource for the uplink burst is reallocated. In this instance, the uplink burst can be allocated by the synchronous HARQ mode or the asynchronous HARQ mode.

In other words, when the terminal fails to receive the uplink burst in the synchronous frame, it is changed into the asynchronous HARQ mode for allocation. That is, the case in which the notation of 0 in the allocation bit map of the resource allocation map transmitted by the base station includes subsequent cases.

The first case is that the base station normally receives the uplink burst from the terminal, and the second case is that the uplink burst allocated by the base station is changed into the asynchronous HARQ mode to be allocated. Therefore, the terminal must not delete but store the previous burst until the maximum transmission delay or until a new burst is allocated to the corresponding HARQ channel.

Next, a method for simultaneously performing an uplink bandwidth request by using an uplink feedback channel as a feedback channel for the downlink burst in order to reduce the delay caused by a bandwidth request process during uplink transmission according to another exemplary embodiment of the present invention will now be described. For this, usage of an uplink feedback channel will be defined as follows:

1. Case of failing to receive a downlink burst: do not transmit HARQ ACK information to the base station through an uplink feedback channel.

2. Case of successively receiving a downlink burst: transmit HARQ ACK information to the base station through an uplink feedback channel.

2-1: Case of needing no uplink bandwidth: transmit 0 to the base station.

2-2: Case of needing an uplink bandwidth: transmit 1 to the base station.

That is, when the terminal uses the uplink feedback channel to transmit uplink bandwidth request information to the base station, a transmission delay generated by a random access can be reduced. Also, the uplink bandwidth can be efficiently used.

In addition to the above-defined method, it is possible to transmit non-acknowledgment (HARQ NAK) information to the base station through an uplink feedback channel when the terminal fails to receive the downlink burst. Simultaneously, it is possible to transmit 0 or 1 depending on whether a bandwidth request for the uplink is needed.

Further, it is possible to design information of the uplink feedback channel with 2 bits so as to perform a bandwidth request through the uplink feedback channel. In other words, the above-described uplink feedback channel is exemplified based on the case of 1 bit, and the uplink burst can/cannot be requested depending on the downlink burst acknowledgment or non-acknowledgment state. However, when the allocation bit map is designed in 2 bits, the downlink burst result and the uplink burst request are performed concurrently.

A HARQ feedback transmission method by a terminal will now be described with reference to FIG. 4. In the exemplary embodiment of the present invention, the allocation bit map will be exemplified to have 1 bit.

Figure 4:
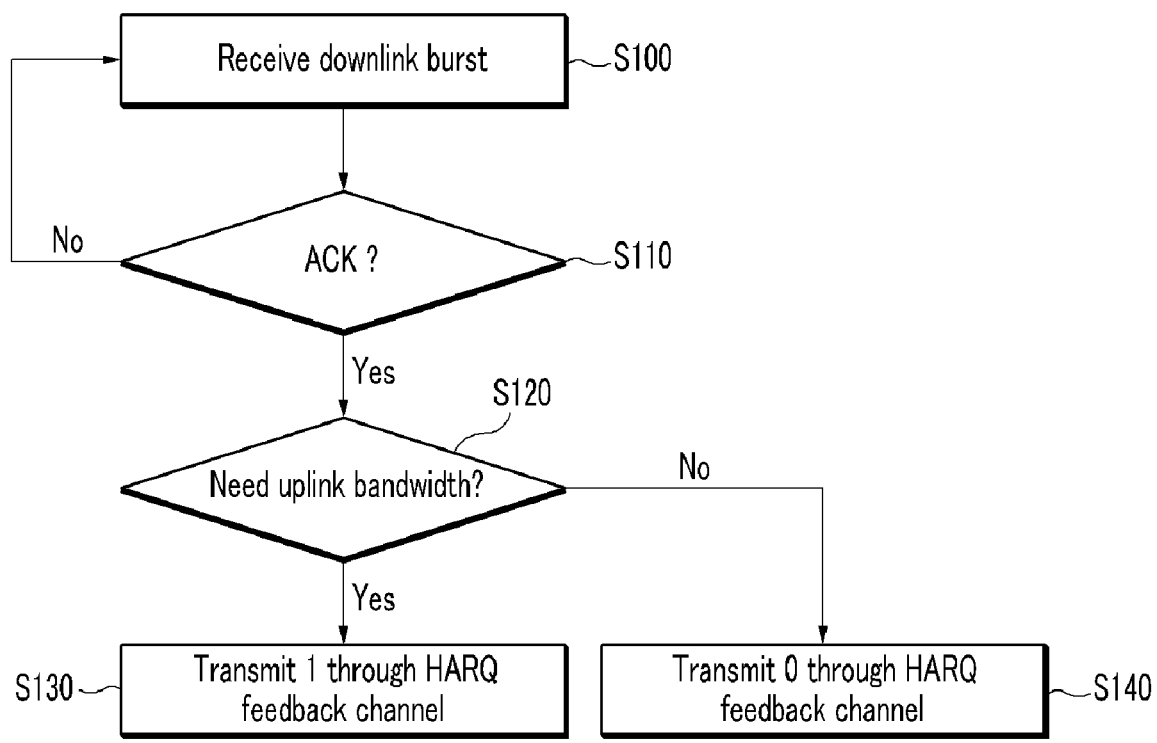
FIG. 4 shows a flowchart of a HARQ feedback transmission method of a terminal according to an exemplary embodiment of the present invention.

FIG. 4 shows a flowchart of a HARQ feedback transmission method by a terminal according to an exemplary embodiment of the present invention.

As shown in FIG. 4, the terminal receives burst information on a downlink burst length and an allocation order from the initial frame transmitted by the base station through the MAP, and stores the same (S100), and determines whether to have received a downlink burst (S110). When the terminal failed to receive the downlink burst allocated to the terminal, the terminal stands by for receiving the downlink burst. In this instance, the downlink burst can be reallocated through the synchronous HARQ method or the asynchronous HARQ method. Simultaneously, the terminal notifies the base station of failure of receiving the downlink burst through the uplink feedback channel.

However, when receiving a downlink burst allocated to the terminal, the terminal transmits receiving success information to the base station through the uplink feedback channel so as to notify receiving of the burst. In this instance, the terminal determines whether an uplink bandwidth is needed based on information buffered to the terminal and notifies the base station of it through the uplink feedback channel (S120).

When an uplink bandwidth is needed, the terminal transmits 1 to the base station (S130), and if not, it transmits 0 thereto (S140). In this instance, when the information bit of the uplink feedback channel is realized as 2 bits, it can be expressed as "acknowledged (ACK only)", "acknowledged and an uplink bandwidth request (ACK & BR)", "not acknowledged (NAK only)", or "not acknowledged and an uplink bandwidth request (NAK & BR)".

When the uplink feedback channel is used as described above, no additional random access delay for requesting an uplink bandwidth is generated.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resource reallocation method comprising:
receiving a first frame including a plurality of bursts corresponding to a plurality of pieces of burst information from a base station, the burst information including uplink burst information and downlink burst information;
storing the plurality of pieces of burst information from the received first frame, and checking first burst information allocated to itself;
checking burst retransmission information when failing to receive the first burst from the first frame, the burst retransmission information including retransmission information having a bit that is established to correspond to an initial transmission order of a burst established by the first retransmission mode from among a plurality of bursts to be retransmitted; and
receiving the first burst from the first frame when the burst retransmission information includes the first burst information, the first burst being set to be a first retransmission mode.

2. The resource reallocation method of claim 1, wherein the initial transmission order represents an order in which bursts including a plurality of bursts to be transmitted are transmitted in a frame prior to the first frame.

3. The resource reallocation method of claim 2, wherein the method includes,
when the burst retransmission information includes no information on the first burst:
determining that the first burst is established by a second retransmission mode, and checking whether a frame that is transmitted after the second frame includes retransmission information on the first burst; and
receiving the first burst from the frame including the retransmission information.

4. The resource reallocation method of claim 1, wherein the method includes,
when the received the first burst is a downlink burst:
determining whether to request an uplink bandwidth from the base station;
when requesting the uplink bandwidth, receiving uplink bandwidth allocation information that is transmitted from the base station through a retransmission request feedback channel, the uplink bandwidth allocation information including information on an uplink burst established by a first transmission mode; and receiving the requested uplink bandwidth based on the uplink bandwidth allocation information.

5. The resource reallocation method of claim 4, wherein the retransmission request feedback channel transmits an acknowledged message for the retransmitted downlink burst to the base station.

6. The resource reallocation method of claim 1, wherein the method includes, when the first burst is an uplink burst and fails to receive the uplink burst:

checking whether the burst retransmission information includes information on the uplink burst;

when it includes no information on the uplink burst, determining that the uplink bandwidth burst is established by a second transmission mode, and checking whether the burst retransmission information includes information on the uplink burst from a frame that is after the frame in which the uplink bandwidth allocation information is transmitted; and receiving an uplink burst from the frame including information on the uplink burst.

7. The resource reallocation method of claim 6, wherein the method further includes, when the burst retransmission information includes no information on the uplink burst:

determining that a bandwidth for the uplink burst is allocated, and buffering the uplink burst received from the base station.

8. A resource reallocation method comprising:

receiving a first frame including a plurality of bursts corresponding to a plurality of pieces of burst information from a base station, the burst information including downlink burst information and uplink burst information;

when failing to receive a first burst corresponding to first burst information from the first frame, checking burst retransmission information included in a second frame, the second frame being a retransmission frame established by a synchronous HARQ mode;

when the burst retransmission information includes the first burst information, receiving the first burst in the second frame; and when the burst retransmission information does not include the first burst information, determining that the first burst is established by an asynchronous HARQ mode, and receiving the first burst in the frame including the first burst information from among the frame that is transmitted after the second frame.

9. The resource reallocation method of claim 8, wherein the receiving of the first frame further includes:

storing the plurality of pieces of burst information included in the first frame; and the plurality of pieces of burst information are used to check a location of the first burst included in the second frame.

10. The resource reallocation method of claim 8, wherein the method includes, when the received first burst is a downlink burst:

determining whether to request an uplink bandwidth from the base station;

when requesting the uplink bandwidth, receiving uplink bandwidth allocation information that is transmitted from the base station through a retransmission request feedback channel, the uplink bandwidth allocation information including information on an uplink burst established by a synchronous HARQ mode; and receiving the requested uplink bandwidth based on the uplink bandwidth allocation information.

11. The resource reallocation method of claim 8, wherein the method includes, when the received first burst is an uplink burst:

transmitting a burst to the base station by using the uplink burst, and determining whether to receive a response to the transmitted burst;

when failing to receive the response from the base station, determining that the uplink bandwidth burst is established by an asynchronous HARQ mode, and checking whether information on the uplink burst is included from a frame after the frame in which the uplink bandwidth allocation information is transmitted; and receiving an uplink burst from the frame including information on the uplink burst.

12. A resource reallocation method comprising:

allocating a burst to a terminal, the burst including an uplink burst and a downlink burst;

including burst information corresponding to the allocated burst in a first frame, and transmitting the same to the terminal;

when receiving a retransmission request message from the terminal because of transmission failure of a HARQ feedback for the burst, establishing a retransmission mode of the burst;

when the established retransmission mode is a synchronous HARQ mode, including retransmission burst information on the burst and a burst to be retransmitted at a predetermined retransmission time, and transmitting the same to the terminal; and when the established retransmission mode is an asynchronous HARQ retransmission mode, generating retransmission time information on the burst, transmitting it to the terminal, and retransmitting the downlink burst in a second frame that is the retransmission time information.

13. The resource reallocation method of claim 12, wherein the burst information includes length information of the burst and allocation order information of the burst.

14. The resource reallocation method of claim 12, wherein the method further includes, after the transmitting to the terminal:

determining whether to have received a bandwidth request message on an uplink from the terminal; and when receiving the bandwidth request message, allocating an uplink bandwidth to the terminal, including uplink bandwidth allocation information therein, and transmitting the same.

15. The resource reallocation method of claim 12, wherein the uplink bandwidth allocation information includes information for indicating that the uplink burst is transmitted by a synchronous HARQ mode.

16. The resource reallocation method of claim 15, wherein the uplink bandwidth allocation information is transmitted to the terminal through a retransmission request feedback channel.

* * * * *